United States Patent
Chen

(10) Patent No.: US 9,890,314 B2
(45) Date of Patent: Feb. 13, 2018

(54) USING HEAT OF SOLUTION OF ALUMINUM SULFATE TO STORE ENERGY IN TANKLESS VACUUM-TUBE SOLAR WATER HEATERS

(71) Applicant: The Trustees of Columbia University in the City of New York, New York, NY (US)

(72) Inventor: Chengjun Julian Chen, White Plains, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 14/551,363

(22) Filed: Nov. 24, 2014

(65) Prior Publication Data

US 2016/0146509 A1    May 26, 2016

(51) Int. Cl.
*F24J 2/48* (2006.01)
*C09K 5/06* (2006.01)
(Continued)

(52) U.S. Cl.
CPC .............. *C09K 5/063* (2013.01); *F24J 2/055* (2013.01); *F24J 2/34* (2013.01); *F24J 2/4647* (2013.01);
(Continued)

(58) Field of Classification Search
USPC ........................................ 126/619, 644, 618
See application file for complete search history.

(56) References Cited

U.S. PATENT DOCUMENTS 2,342,211 A * 2/1944 Newton ................ F24F 5/0046
126/585
3,954,097 A * 5/1976 Wilson, Jr. ................ F24J 2/14
126/623
(Continued)

FOREIGN PATENT DOCUMENTS

GB         2103783 A      2/1983

OTHER PUBLICATIONS

Solutions of Aluminum Sulfate—Mean Specific Heat (Heat Capacity) Chemtrade; Technical Data Sheet; Revised Feb. 18, 2014; Accessed by Examiner Sep. 29, 2015 http://www.generalchemical.com/assets/pdf/Alum_Mean_Specific_Heat_Graph.pdf.*
(Continued)

*Primary Examiner* — Gregory Huson
*Assistant Examiner* — Martha Becton
(74) *Attorney, Agent, or Firm* — Murtha Cullina LLP; Anthony P. Gangemi

(57) ABSTRACT

The present invention generally relates to solar water heaters, in particular to solar water heaters using glass vacuum tubes as both solar energy collector and thermal energy storage device, without a hot water storage tank. To improve the efficiency of thermal energy storage, a novel medium for thermal energy storage is disclosed, which utilizes the heat of solution of aluminum sulphate, comprising water and 40% to 47% of $Al_2(SO_4)_3$. The working temperature range of such energy storage medium is between 50° C. and 100° C. The energy storage medium is contained in plastic capsules, submerged in water and placed in glass vacuum tubes.

11 Claims, 9 Drawing Sheets

(51) Int. Cl.
*F24J 2/05* (2006.01)
*F24J 2/34* (2006.01)
*F24J 2/46* (2006.01)
*F28D 20/02* (2006.01)
*F28D 20/00* (2006.01)

(52) U.S. Cl.
CPC ...... *F28D 20/02* (2013.01); *F28D 2020/0021* (2013.01); *Y02B 10/22* (2013.01); *Y02E 10/44* (2013.01); *Y02E 60/145* (2013.01); *Y02E 70/30* (2013.01)

(56) References Cited

U.S. PATENT DOCUMENTS

| | | | | | |
|---|---|---|---|---|---|
| 4,136,668 | A | * | 1/1979 | Davis | F24J 2/34 126/400 |
| 4,178,727 | A | * | 12/1979 | Prusinski | F24J 2/34 165/104.13 |
| 4,238,873 | A | * | 12/1980 | Frank | F24D 17/0021 126/590 |
| 4,250,958 | A | * | 2/1981 | Wasserman | F28D 20/02 126/618 |
| 4,262,653 | A | * | 4/1981 | Holland | F28D 20/02 126/400 |
| 4,469,088 | A | * | 9/1984 | Anzai | F24J 2/07 126/400 |
| 4,686,961 | A | * | 8/1987 | Garrison | F24J 2/32 126/635 |
| 6,615,906 | B1 | * | 9/2003 | Fieback | A01K 5/0114 165/10 |
| 8,191,549 | B2 | * | 6/2012 | Schedletzky | F24J 2/055 126/651 |
| 9,279,601 | B2 | * | 3/2016 | Pang | F24J 2/32 |
| 2010/0011794 | A1 | * | 1/2010 | De Lima | F01K 13/00 62/235.1 |
| 2010/0199973 | A1 | * | 8/2010 | Hook | F24J 2/055 126/610 |
| 2011/0277746 | A1 | | 11/2011 | Smyth | |
| 2012/0060896 | A1 | * | 3/2012 | Schafer | H02S 40/44 136/246 |
| 2012/0131941 | A1 | * | 5/2012 | Ackner | F24J 2/055 62/235.1 |
| 2012/0132195 | A1 | * | 5/2012 | Chen | F24J 2/055 126/610 |
| 2012/0291433 | A1 | * | 11/2012 | Meng | F01K 25/08 60/641.15 |
| 2013/0074830 | A1 | * | 3/2013 | Mulcey | F24J 2/14 126/657 |
| 2013/0239951 | A1 | | 9/2013 | Grandinetti | |
| 2014/0060046 | A1 | * | 3/2014 | Takahashi | F28D 20/02 60/641.8 |
| 2014/0123646 | A1 | * | 5/2014 | Muren | F24J 2/34 60/641.11 |
| 2015/0040888 | A1 | * | 2/2015 | Zakhidov | F24J 2/34 126/618 |

OTHER PUBLICATIONS

International Search Report and The Written Opinion of the International Searching Authority, International Application No. PCT/US2015/061824, dated Feb. 2, 2016.

* cited by examiner

ALUMINIUM SULFATE ALUMINIUM SULFATE Al₂(SO₄)₃·18H₂O.

SOLUBILITY IN WATER.

(Poggiale, 1843; Kremann and Hüttinger, 1908.)

| t°. | Gms. Al₂(SO₄)₃ per 100 Gms. Sat. Sol. | Solid Phase. | t°. | Gms. Al₂(SO₄)₃ per 100 Gms. Sat. Sol. | Solid Phase. |
|---|---|---|---|---|---|
| −1.02 | 8.09 | Ice | 20 | 26.7 | Al₂(SO₄)₃·18H₂O |
| −1.43 | 10.7 | " | 30 | 28.8 | " |
| −2.04 | 14.3 | " | 40 | 31.4 | " — 101 |
| −2.65 | 17.5 | " | 50 | 34.3 | " — 102 |
| −2.85 | 19.2 | " | 60 | 37.2 | " — 103 |
| −4 Eutec. | 23.1 | Ice + Al₂(SO₄)₃·18H₂O | 70 | 39.8 | " — 104 |
| 0 | 23.8 | Al₂(SO₄)₃·18H₂O | 80 | 42.2 | " — 105 |
| +7.73 | 24.8 | " | 90 | 44.7 | |
| 10 | 25.1 | " | 100 | 47.1 | |

USING HEAT OF SOLUTION OF ALUMINUM SULFATE TO STORE ENERGY IN TANKLESS VACUUM-TUBE SOLAR WATER HEATERS

FIELD OF THE INVENTION

The present invention generally relates to solar water heaters, in particular to solar water heaters using heat of solution of aluminum sulfate inside glass vacuum-tube solar radiation collectors to store energy, together with a water handling apparatus to transfer stored energy to water. The system can operate without a hot water storage tank.

BACKGROUND OF THE INVENTION

To date, for most solar water heaters, both those using flat-plate collectors and those using vacuum-tube collectors, hot-water storage tank is an essential component, because sunlight is intermittent. To keep the water hot for hours and days without sunlight, tank size must be sufficiently large, typically 100 liters to 250 liters. For convection-operated systems, the tank must be placed above the solar radiation collector. The weight of the tank is acting on the roof as a concentrated mechanical pressure. If the heat storage tank is placed no higher than the heat collector, an electric pump is necessary. The electrical pumps, control units, connecting pipes and valves between the solar thermal energy collector and the heat-storage tank are expensive, and require frequent service and maintenance.

The vacuum tubes as solar radiation collectors are also excellent heat storage devices because of the vacuum sleeve. To one with an ordinary skill in the field of solar water heaters, it is obvious that vacuum tubes can be used to store energy. Therefore, an array of vacuum tubes alone could function as a complete solar water heater without a hot water storage tank. Such a design is advantageous over the solar water heaters with a tank: Comparing with the integrated convection-driven systems, the overall structure is simplified, and the mechanical pressure on the roof is reduced and evenly distributed. Comparing with the separated systems, the electricity-powered pump and control unit can be eliminated; therefore the system can run maintenance free. However, by using sensible heat of water to store thermal energy, the volume must be very large. Vacuum tubes of very large diameter must be used. Therefore, in order to build a tankless solar water heater, two problems must be resolved. First, to find a type of thermal-energy storage medium with the following properties: (1) having a heat capacity much greater than water in the upper range of water temperature; (2) having no hysteresis or incongruent phenomenon during heat cycling; (3) inexpensive; and (4) nontoxic. Second, to design a water handling apparatus to transfer the thermal energy stored inside the vacuum tubes to running water with the following properties: (1) with no need of an electrical power; (2) automatic control based on the nature of materials; (3) ensuring the highest possible efficiency; (4) minimizing heat loss; (5) inexpensive to produce; and (6) easy to install. It is the goal of the current invention to resolve the above problems to construct tankless solar water heaters using vacuum tubes.

BRIEF SUMMARY OF THE INVENTION

The current invention discloses first a novel medium for thermal energy storage by utilizing the heat of solution of aluminum sulphate. In the temperature range of 70° C. to 90° C., direct experiments show that the heat capacity of aluminum sulfate solution within a well-defined concentration range is more than 2 times the heat capacity of water per unit volume. Therefore, the volume required to store thermal energy is reduced by a factor of more than two. Next, the current invention discloses a design of a water handling apparatus that would satisfy all the requirements stated in the previous paragraph.

BRIEF DESCRIPTION OF THE DRAWINGS

FIG. 1 shows the solubility data for aluminum sulfate.

DETAILED DESCRIPTION OF THE INVENTION

Currently, the most popular solar thermal energy collector is the glass vacuum-tube collector. Every year, more than 200 million pieces of glass vacuum tubes are produced and installed. Each said vacuum tube has an outer glass tube and an inner glass tube with a vacuum between the two said glass tubes, and a selective absorption coating on the outer surface of the said inner glass tube to absorb solar radiation and to reduce the heat radiation from the material inside the said inner glass tube. Because solar radiation is intermittent, solar water heaters require a large insulated water tank to store thermal energy, typically 100 liters to 250 liters. Vacuum tubes are superb thermal insulation devices. To one with an ordinary skill in the field of solar water heaters, it is obvious that vacuum tubes can be used to store energy. Therefore, an array of vacuum tubes alone could function as a complete solar water heater without a hot water storage tank. However, by using the sensible heat of water to store thermal energy, the volume needed is very large. Materials with heat capacity much greater than water are advantageous.

As an energy storage medium, phase change materials (PCM) have been studied since 1960s, as shown in U.S. Pat. No. 2,677,664. There are many books and articles about PCM, a recent review is A. Sharma, V. V. Tyagi, C. R. Chen, and D. Buddhi, "Review on thermal energy storage with phase change materials and applications", Renewable and Sustainable Energy Reviews, 13 (2009) 318-345. PCMs refer to materials that change its phase at a well-defined temperature, and absorb or release thermal energy during change. An example is paraffin wax, which melts at about 60° C. Sodium sulfate, or the Glauber's salt, changes its state of hydrate at 32° C. However, in the temperature range of solar water heaters, there are very few useful PCM materials. Many salt hydrates show incongruent melting, super cooling or super heating. Paraffin wax has huge volume change during melting, making encapsulation difficult.

The advantage of PCM is the ability to keep the system at a well-defined temperature. However, for solar water heaters, a high heat capacity within a suitable temperature range, for example, 70° C. to 90° C. is sufficient. We disclose here that the heat of solution of aluminum sulfate can be used as thermal energy storing medium for solar water heaters.

Figure 2:
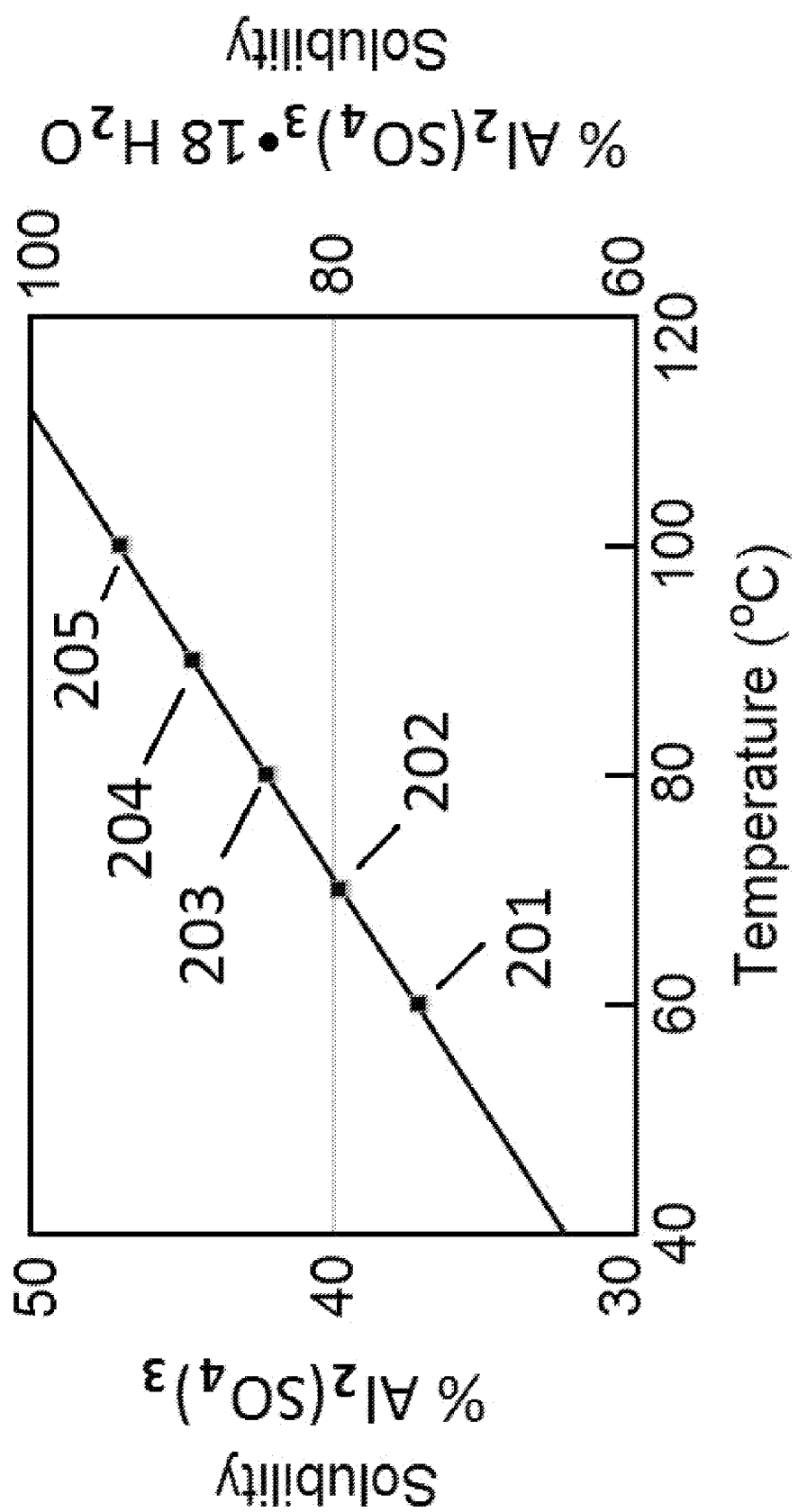
FIG. 2 shows a chart of solubility of aluminum sulfate from the data of FIG. 1.
Figure 3:
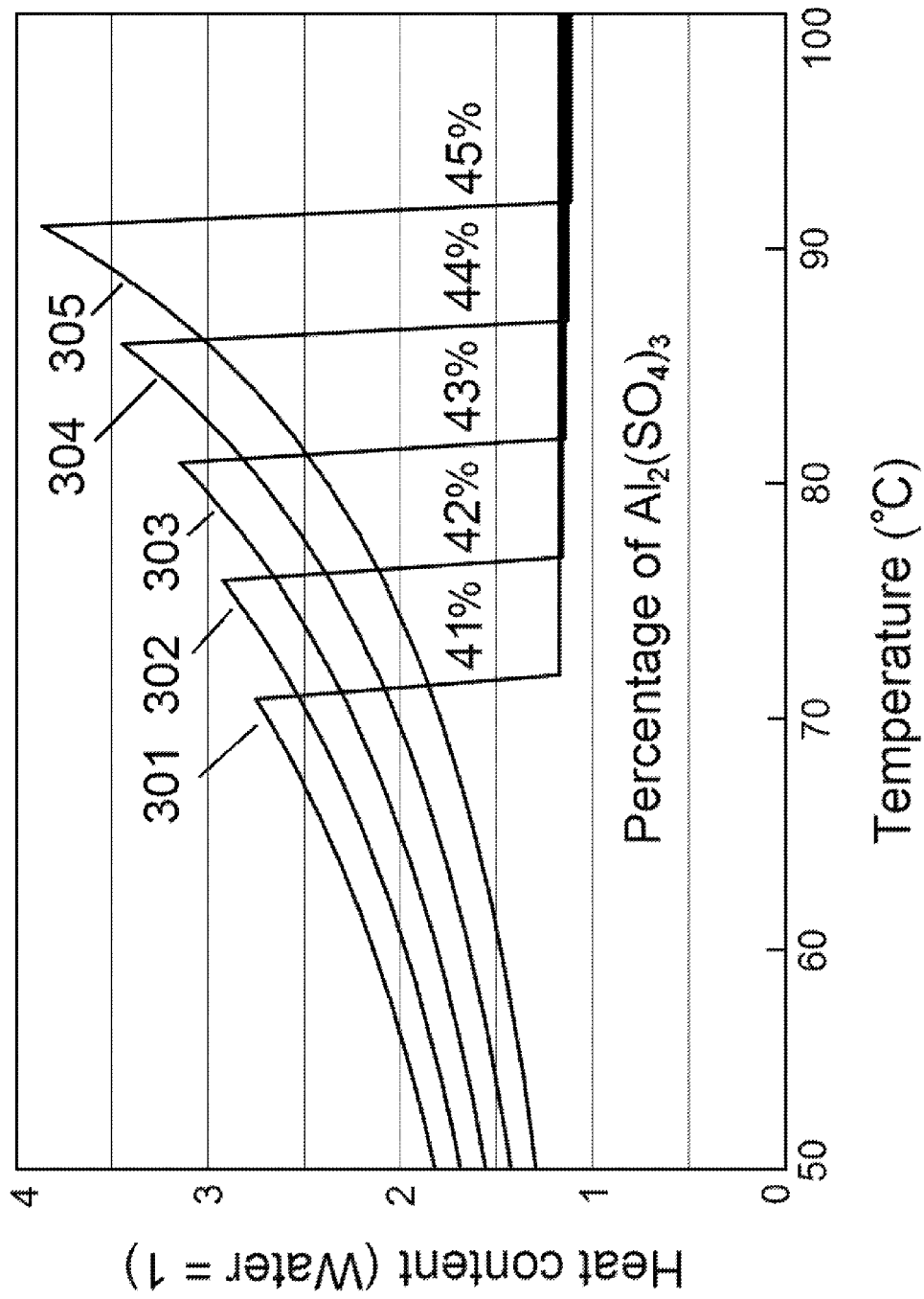
FIG. 3 shows the predicted heat capacity of aluminum sulfate solution.

Aluminum sulfate is widely used in waste water treatment, paper industry, and food industry. The properties of aluminum sulfate are well known. The solubility data, on page 29 of "Solubilities of Inorganic and Organic Substances", Atherton Seidel, D. Van Norstrand Co., New York 1919, is shown in FIG. 1. FIG. 2 is drawn based on the data shown in FIG. 1. Data points 201 through 205 are taken from items 101 through 105 in FIG. 1. The left side scale is weight percentage of $Al_2(SO_4)_3$ in the solution. The right side scale is weight percentage of $Al_2(SO_4)_3.18H_2O$ in the solution. As shown in FIG. 1, item 106, the solid phase is $Al_2(SO_4)_3.18H_2O$, which has a mole weight approximately twice as that of anhydrous $Al_2(SO_4)_3$.

As shown in FIG. 2, aqueous system of 40% to 47% $Al_2(SO_4)_3$ is a mixture of liquid and solid in the useful range of temperature. For example, for a system with 44.7% $Al_2(SO_4)_3$, at temperatures above 90° C., the system is liquid only. When temperature drops below 90° C., aluminum sulfate starts to crystallize into $Al_2(SO_4)_3.18H_2O$. As the kinetic energy of the component molecules is frozen, it releases a heat of solution. The heat of solution for $Al_2(SO_4)_3.18H_2O$ can be estimated from the transition enthalpy near its melting point, which is 117.7 KJ/mol, or 176.7 KJ/Kg, see "Thermodynamic Properties and Phase Transitions of Salt Hydrates between 270 and 400 K", by F. Gronvold and K. K. Meisingset, Journal of Chemical Thermodynamics, 1982, pages 1083-1098. The heat of solution at various temperatures can be calculated from its solubility data, as shown in the curves, 301 through 305.

Figure 4:
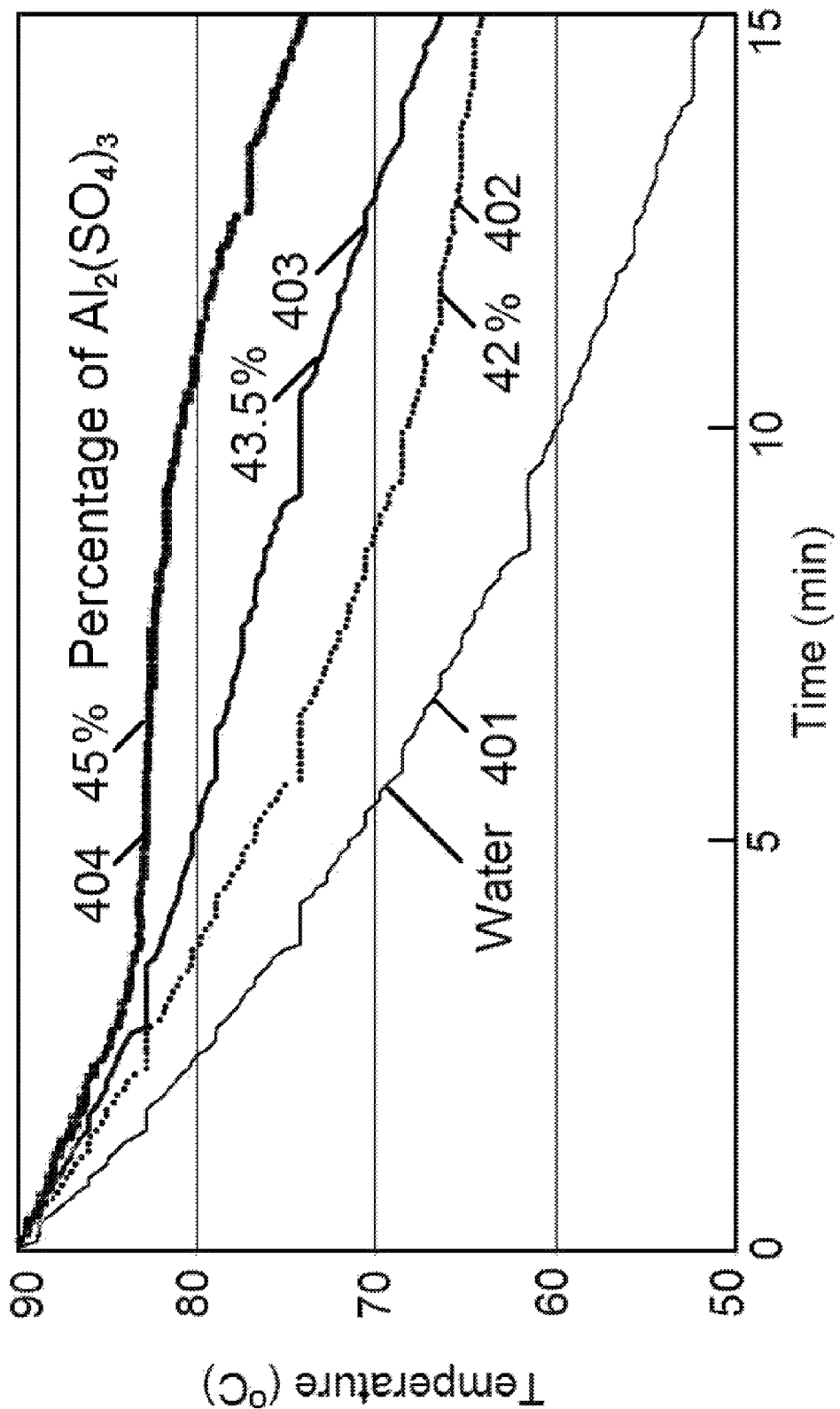
FIG. 4 shows the experimental cooling curves of aluminum sulfate solution.

Experimental data confirms the above analysis, as shown in FIG. 4. By filling various aluminum sulfate solutions in identical test tubes, then let it cool down under identical conditions. The temperature data from an automatic temperature recorder clearly demonstrates the effect of thermal energy storage. For comparison, curve 401 is for pure water. Curves 402, 403, and 404 are for aluminum sulfate solutions of various concentrations. At the temperature ranges of 70° C. to 90° C., the heat capacity of aluminum sulfate solution is more than 2 times of water. Through experiments, it was also found that the aluminum sulfate solution is well behaved: there is no incongruent phenomenon, no overheating and no overcooling. In contrast with paraffin wax, volume change during transition is very small. Therefore, encapsulation is easy. Furthermore, on the international market, the price for $Al_2(SO_4)_3.14H_2O$ is $160 per metric ton, whereas the price for paraffin wax is $1400 per metric ton.

Figure 5E:
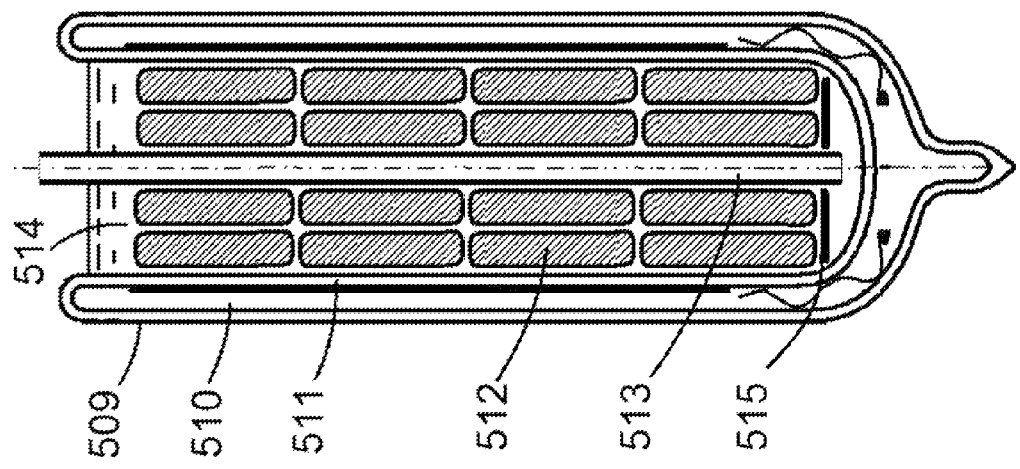
FIGS. 5A-5E show plastic capsules containing aluminum sulfate solution and the placement of the said capsules in a vacuum tube.
Figure 5C:
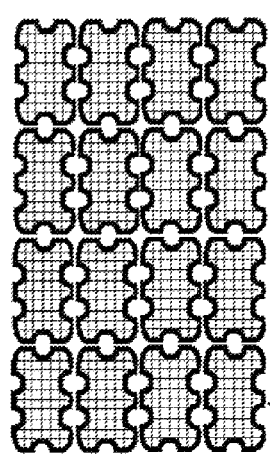
Figure 5D:
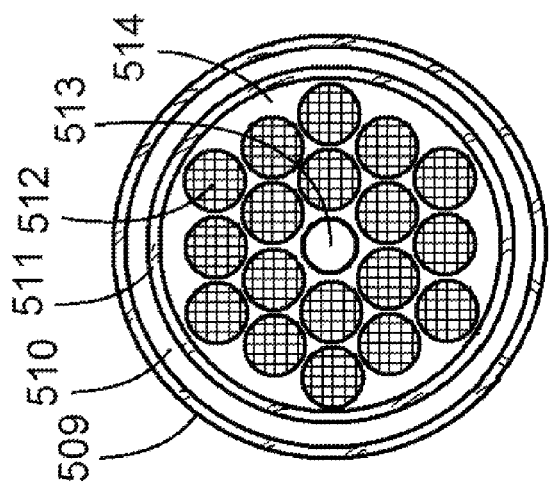
Figure 5A:
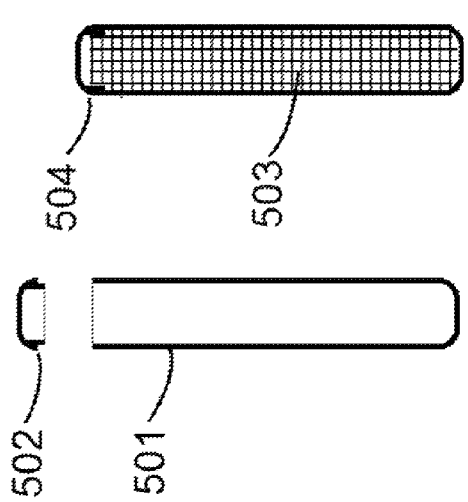
Figure 5B:
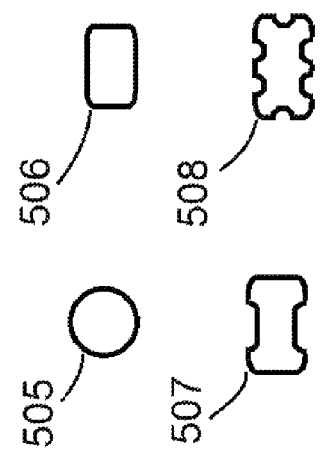

Aluminum sulfate is non-flammable, non-toxic, but corrosive to metals. Appropriate materials for capsules are high melting-point plastics, including but not limited to polypropylene homopolymer and high-density polyethylene. Because solid-phase aluminum sulfate has a low thermal conductivity, to speed up heat transfer, it is advantageous to encapsulate in tubes, with small circumferences, see FIG. 5A, where 501 is a tube with a cap 502. After the medium is filled, 503, the tube is sealed with the cap, 504. To better transfer heat to and from the medium inside the tubes, the cross section of the tubes should be well designed, see FIG. 5B. The cross sections include but not limited to circular, 505; rounded rectangular, 506; rounded rectangular with two grooves, 507; and rounded rectangular with multiple grooves, 508. FIG. 5C shows how those capsules are packed together. The corners and grooves provide paths for water to pass through. For fast heat transfer, every point of the medium in the capsule should have a small distance to nearest water, preferably less than 10 mm. The tubes are packed in the vacuum tube; where FIG. 5D is a horizontal cross section view, and FIG. 5E is a vertical cross section view. Here 509 is the outer glass tube, 510 is the vacuum space, 511 is the inner glass tube, 512 is plastic capsules with heat-storage medium, 513 is the central tube for water flow, and 514 is water. Item 515 in FIG. 5E is a mechanical support plate for the capsules.

Figure 6:
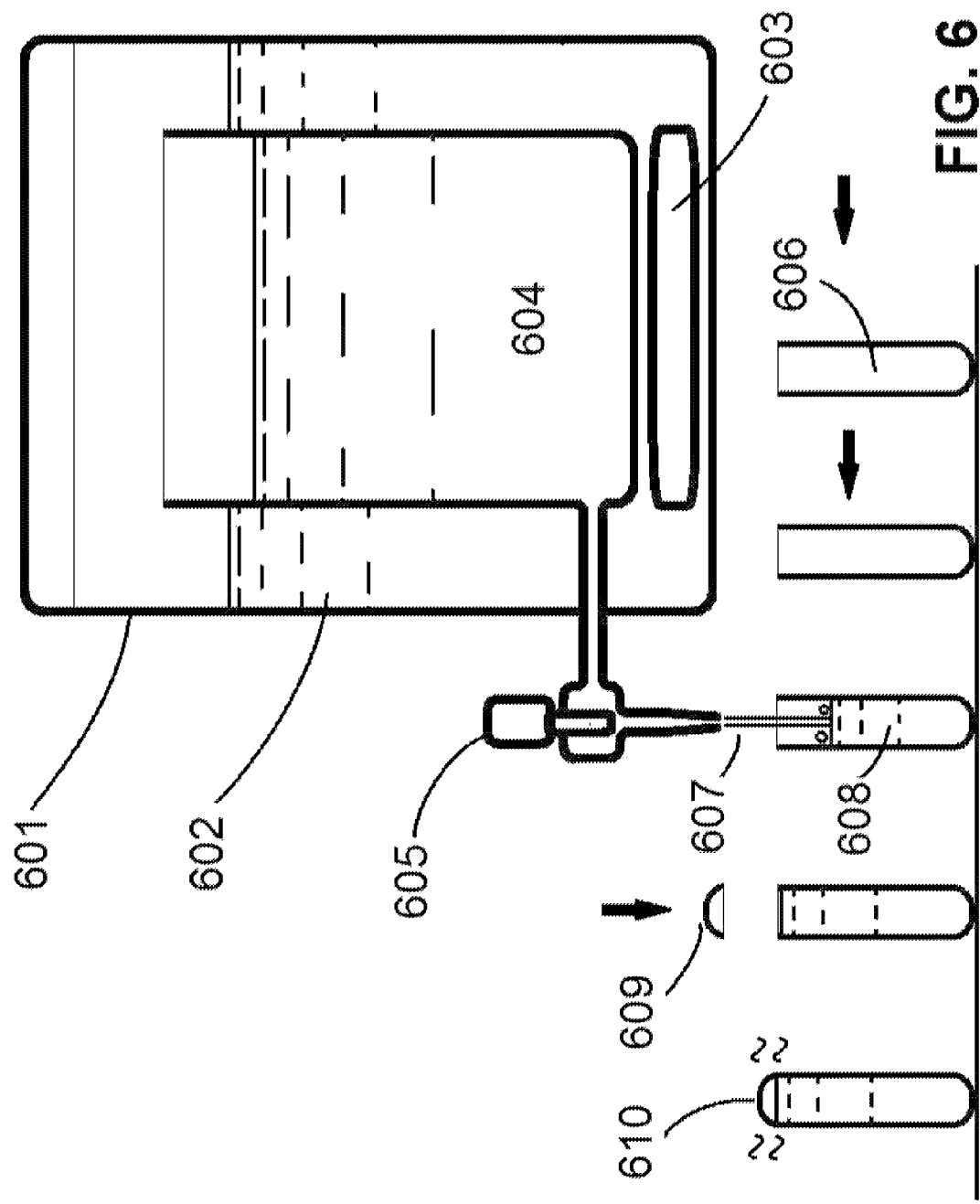
FIG. 6 shows the production process of thermal energy storage capsules.

FIG. 6 shows a continuous process of filling heat storage medium into plastic tubes. 601 is a bath filled with oil 602, including but not limited to Canola oil. An electrical heater 603 with thermostat keeps the temperature of the oil between 110° C. and 120° C. A container filled with aluminum sulfate and water, 604, is placed in the oil bath, and the temperature is kept at around 100° C. to 110° C. Therefore, the medium is in liquid phase. An electromagnetic valve 605 controls the flow of the liquid into the plastic capsules 606, which are mounted on an automatic assembly line, moves to the left hand side as shown here. When a capsule is under the spigot 605, a fixed amount of liquid medium 607 is filled into the capsule, 608. Then a cap 609 is place on the capsule, and sealed by heating, 610.

Figure 7:
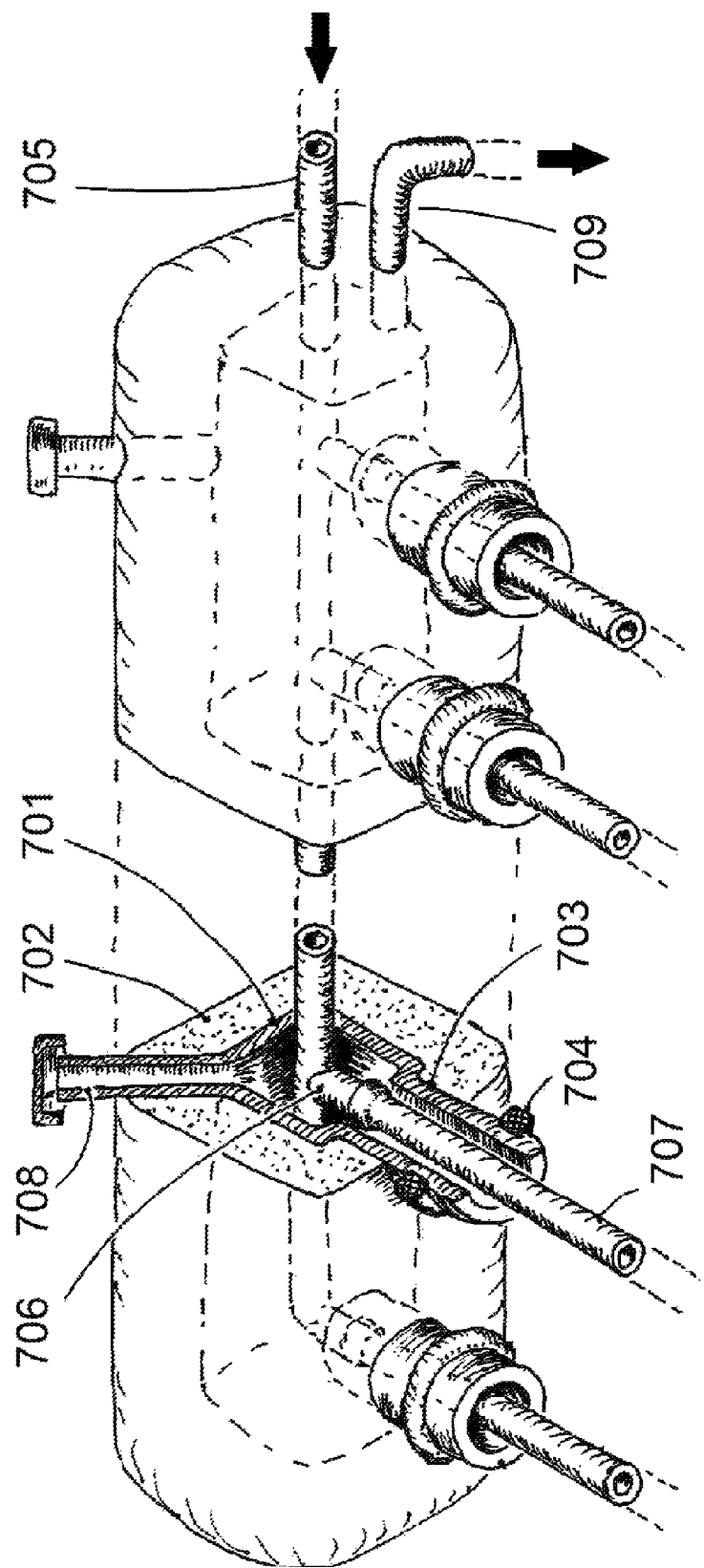
FIG. 7 shows the water handling apparatus.

The energy storage medium, aluminum sulfate and water, works best in the upper temperature range of water, 70° C. to 90° C. To collect maximum solar radiation, to minimize heat loss, to prevent overheating, and to transfer stored thermal energy to water without using an electrically driven pump, a water handling apparatus is designed, as shown in FIG. 7.

The central component of the water handling apparatus is a horizontal chamber 701 of rectangular cross section with side dimensions of 50 to 75 mm (2 to 3 inches), referred to as the hot water chamber. Its length is determined by the number and the external diameter of vacuum tubes. It is enclosed in a thermal insulating cage 702, made of foam polyurethane or a material with similar properties. The hot water chamber 701 has a number of vertical tubes 703, each has at least one gasket 704 fitted on the outside of each said vertical tube. The gaskets are made of silicone elastomer, nitrile butadiene rubber, or a similar elastic material. The dimension of the gasket is designed to seal against the inside of a glass vacuum tube. The distance between the axes of the neighboring vertical tubes is 2 to 10 mm (⅛ to ⅜ inch) larger than the outer diameter of the vacuum tube. When the vertical tubes are inserted into the glass vacuum tubes, the distance between adjacent vacuum tubes is only 2 to 10 mm (⅛ to ⅜ inch).

Inside the hot water chamber 701 is a cold water pipe 705, with diameter 10 to 25 mm (⅜ to 1 inch). The cold water pipe 705 has a number of branch pipes 706, each connected to a pipe 707, extending to the bottom of a glass vacuum tube (same as pipe 513 in FIG. 5E).

On the upper side of the hot water chamber there are one or more outlets 708 open to air. Under operational conditions, the hot water chamber 701 is half filled. The outlets 708 keep the pressure of the water surface in the hot-water chamber 701 equals to the atmosphere pressure. If the water in the hot water chamber 701 reaches the boiling point of water, 100° C., steam escapes through the outlets 708 to dissipate excess heat and then avoid overheating.

Figure 8:
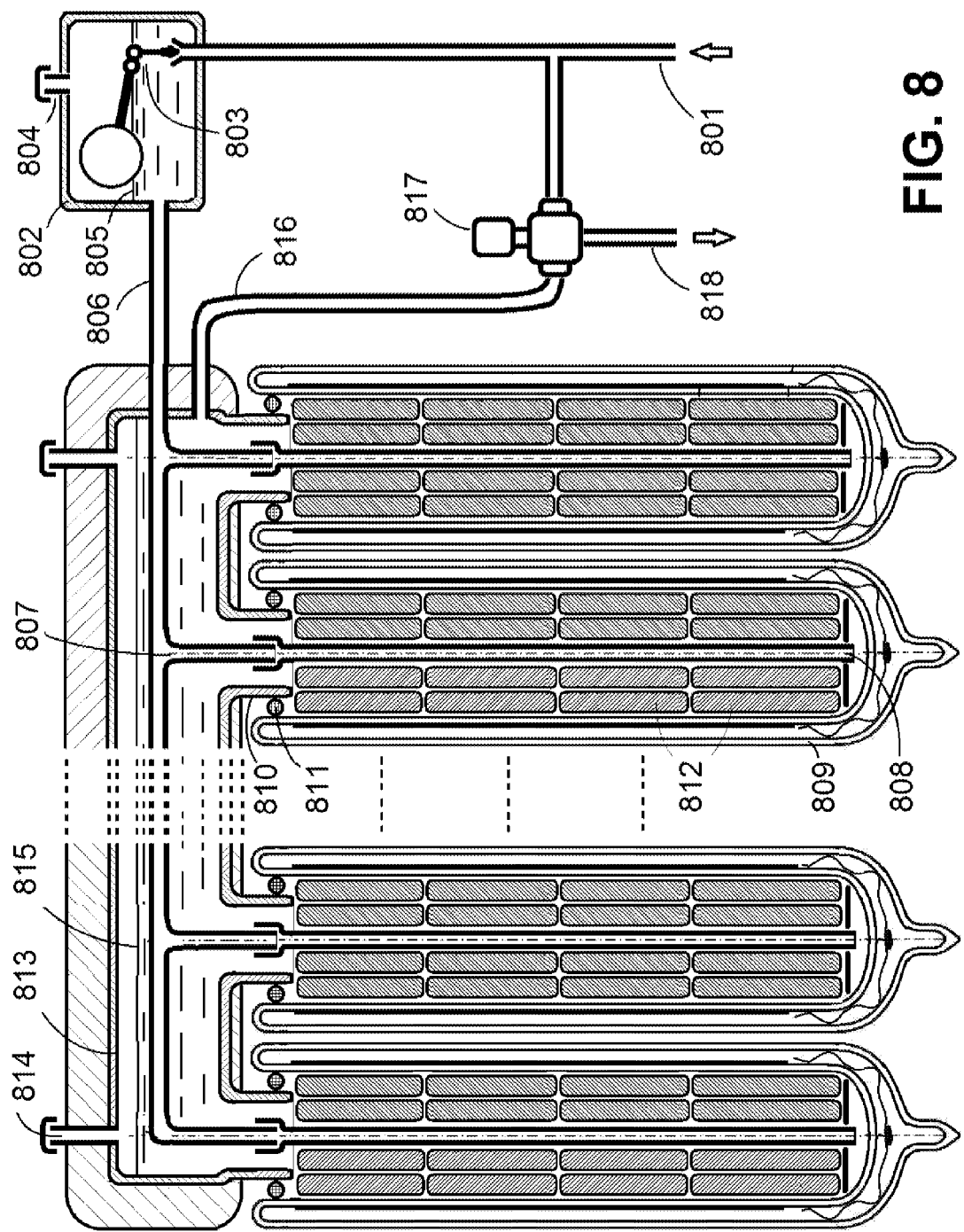
FIG. 8 shows the entire solar water heater system.

At the lower end of the hot water chamber 701 is a hot-water outgoing pipe 709, which is the same as pipe 816 in FIG. 8.

FIG. 8 shows a complete solar water heater. Cold water from cold water line 801 flows to a cold-water supply chamber 802, where the fill valve 803 and the outlet 804 keep the water level 805 constant. Fill valve 803 is the same as used in toilets, for example, Fluidmaster universal fill valve, and Kohler K-1068030 fill valve. Cold water flows through pipe 806 (same as 705 in FIG. 7), and the branch pipes 807 and 808 (same as 706 and 707 in FIG. 7), to the bottom of each glass vacuum tube 809.

Each vertical tube 810 on the hot-water chamber (same as 703 in FIG. 7) is inserted into a vacuum tube 809, sealed with a gasket 811 (same as 704 in FIG. 7). Most of the previous solar water heaters with glass vacuum tubes have gaskets placed on the outside of the vacuum tube to seal with an opening in the water handling apparatus, for example U.S. Pat. No. 5,163,821 Keller et al., and a journal article "Water-in-glass evacuated tube solar water heaters", by G. L. Morrison, I. Budihardjo, and M. Behnia, Solar Energy, 76 (2004) 135-140. According to those previous designs, there is a large space between adjacent vacuum tubes, typically comparable with the diameter of the vacuum tubes, which would lose efficiency by about a factor of two.

The current invention places the gasket inside the vacuum tube to seal with the outside of a said vertical tube; the distance between adjacent vacuum tubes is reduced to a few millimeters. The current design also has the following advantages: First, the total length of the hot-water chamber is reduced; therefore, the heat loss is reduced because the surface of the hot-water chamber is reduced. Second, it facilitates assembly and prevents leakage, because the system is assembled at room temperature, and operating at a higher temperature. The thermal expansion coefficient of Pyrex glass is almost zero. The thermal expansion coefficient of plastics or metals is 0.01% to 0.02% per ° C. If plastic or metal structure is placed to the outside of glass tube, at operating temperature, due to thermal expansion of plastics or metal, the seal of the gasket becomes looser. The current invention places the plastic tube inside the glass tube; at operating temperature, due to high thermal expansion of plastics, the seal of the gasket becomes tighter.

Because the cold-water supply chamber 802 and the hot-water pipe 813 is connected, the water level 815 in the hot-water chamber 813 equals the water level 805 of the cold-water supply chamber 802, which is controlled by the fill valve 803. The fill valve is adjusted to keep the hot-water chamber 813 half filled. The outlet 814 thus serves as an overheating protection device. If the water temperature reaches the boiling point of water, 100° C., steam escapes through the outlets to dissipate excess heat.

During operation, cold water flows from the bottom of pipe 808 through the thermal energy storage capsules 812, and then being heated up. Because hot water is lighter than cold water, hot water always stays at the top, especially in the hot-water chamber 813.

At a lower point of the hot-water chamber 813, there is a hot-water outgoing pipe 816 (same as 709 in FIG. 7). Because the output from the hot-water chamber 813 could be very hot, to prevent scalding, hot water from pipe 816 first goes into a thermostatic mixing valve 817. By mixing with cold water from pipe 801, warm water 818 with a preset temperature is generated. Thermostatic mixing valve is a commonly available commercial product, covered by American Society of Sanitary Engineering standards ASSE 1016. Examples are Honeywell AM101R-US-1, Watts LF 1170, Zurn Wilkins ZW1070, etc.

Figure 9:
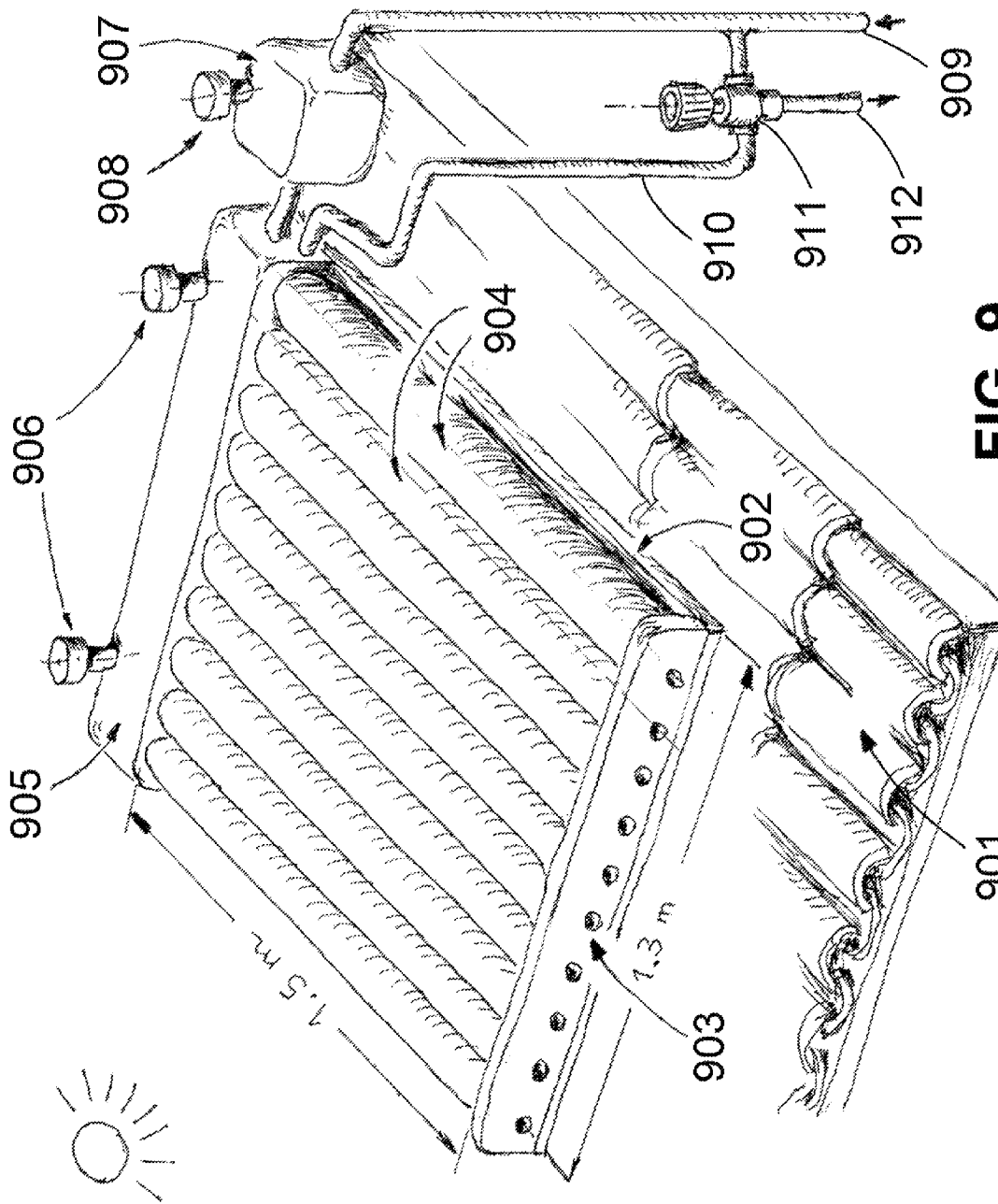
FIG. 9 shows a tankless solar water heater mounted on a roof.

FIG. 9 shows a tankless solar water heater mounted on a roof. The roof 901 should incline to the correct orientation: South in the Northern hemisphere and North in the Southern hemisphere. A basically flat mounting frame 902 can be placed directly on the roof if the roof is adequately angled. An end support structure 903 is attached to the mounting frame 902. The vacuum tubes 904 with heat storage capsules are supported by the water handling apparatus 905 on the top end, and the supporting structure 903 on the bottom end. The steam outlets 906 are at the highest points of the water handling apparatus. The cold-water supply chamber 907, with an air outlet 908, is connected to the water handling apparatus 905. Tap water runs through pipe 909 into the cold-water supply chamber 907, where the water level is controlled by the fill valve in the chamber 907. Sunlight heats up the energy storage medium in the vacuum tubes 904. If the temperature reaches 100° C., excess heat is dissipated as steam through outlets 906. Hot water flows through the hot water outgoing pipe 910 into the thermostatic mixing valve 911. By mixing with cold water, warm water 912 with a preset temperature is generated. Therefore, the mechanical pressure on the roof is light and evenly distributed. The entire system runs on natural law with no electric pump and no control system, thus can run maintenance free.

Here is an estimate of the size of the tankless solar water heater. An available glass vacuum tube has an inner diameter 102 mm and length 1500 mm. The volume of each tube is about 12 liters. Because the heat capacity of aluminum sulfate solution is two times of that of water, it equals to 24 liters of water. A system of 10 vacuum tubes has a total equivalent water volume of about 240 liters, sufficient to support a 4-person family. The price for 150 Kg aluminum sulfate is about $30 on the international market, an insignificant cost.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A solar water heater using comprising:
   at least one glass vacuum tube having an evacuated space between an inner wall and an outer wall to collect solar radiation and to store thermal energy using a thermal energy storage medium comprising water and 40% to 47% of $Al_2(SO_4)_3$;
   wherein said thermal energy storage medium is contained in plastic capsules;
   a conduit extending into said glass vacuum tube defining an inner flow path, having an open end directing water to be heated by said solar water heater from said conduit to the bottom of said glass vacuum tube;
   an outer flow path between said conduit and said inner wall, said outer flow path being coaxial with and counter to said inner flow path;
   wherein said plastic capsules are contained in said outer flow path;
   wherein after exiting said conduit, water is directed through said outer flow path and between said plastic capsules, wherein heat is transferred directly from said plastic capsules to said water to be heated by said solar water heater; and
   at least one gasket in contact with said inner wall, said gasket providing a seal against said inner wall and preventing fluid flow therebetween.

2. The apparatus of claim 1 wherein the inner diameter of said glass vacuum tubes is between 80 mm and 120 mm.

3. The apparatus of claim 1 wherein the said capsules are made of plastics with working temperature higher than 100° C. including polypropylene homopolymer or high density polyethylene.

4. The apparatus of claim 1 wherein the shape of the capsules are tubes of various types of cross sections wherein the distance from each point inside the capsules to the nearest capsule surface is less than 10 mm.

5. The apparatus of claim 1 wherein the capsules are filled with said mixture of water and $Al_2(SO_4)_3$ at a high temperature when the said mixture is pure liquid.

6. The apparatus of claim 1 wherein the capsules are filled with the said mixture of water and $Al_2(SO_4)_3$ using an automatic machine, and then a cap of the capsule is sealed after filled.

7. A water handling apparatus to transfer the thermal energy inside glass vacuum tubes of claim 1 to running water comprises:
  a horizontal hot-water chamber of rectangular cross section with side dimensions 50 mm to 75 mm and length determined by the product of the number of vacuum tubes multiplied by the sum of the outer diameter of the vacuum tube and a spacing of 3 mm to 10 mm;
  a number of vertical tubes connected to the lower side of the said hot-water chamber,
  each said vertical tube has one or more gaskets fitted to the outside of the said vertical tube, each said gasket is designed to seal against the inner surface of a said glass vacuum tube;
  a thermal insulation cage enclosing the said hot-water chamber;
  a horizontal cold water pipe of diameter 10 mm to 25 mm inside the said hot-water chamber;
  a number of vertical cold-water pipes connected to the said horizontal cold-water pipe, which extends through each said horizontal tube to reach the bottom of each said glass vacuum tube;
  one or more outlet pipes at the high end of the said hot-water chamber for steam escape;
  a cold-water supply chamber comprising a fill valve receiving cold water from the running water supply and connected to the hot-water chamber through the said horizontal cold-water pipe to control the water level such that the water level in the said hot-water chamber is half filled;
  a hot-water pipe from the lower end of the said hot-water chamber connected to the hot-water inlet of a thermostatic mixing valve, and the cold-water inlet of the said thermostatic mixing valve is connected to the source of running cold water, such that the temperature of the warm water from the outlet of the said thermostatic mixing valve remains constant.

8. The apparatus of claim 7 wherein the said hot-water chamber and said tubes and pipes are made of plastics with working temperature higher than 100° C. including but not limited to polypropylene homopolymer.

9. The apparatus of claim 7 wherein the said hot-water pipe outside the said hot-water chamber is insulated with foam plastics including but not limited to polyurethane.

10. The apparatus of claim 7 wherein the said gaskets are made of silicone elastomer.

11. The apparatus of claim 7 wherein the said gaskets are made of nitrile butadiene rubber.

* * * * *